Figure 1:
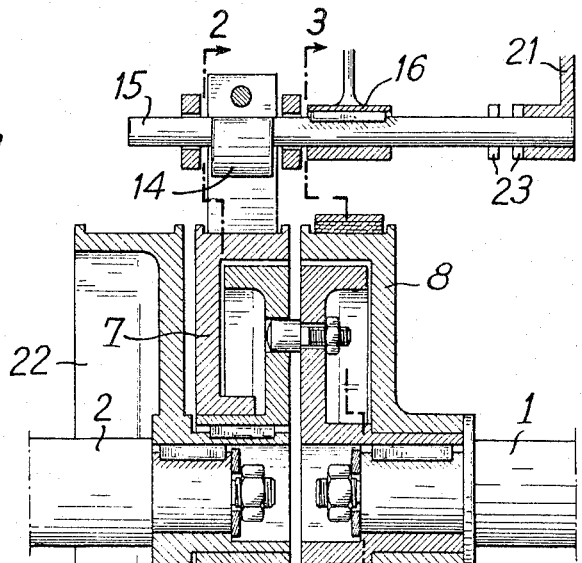

Oct. 4, 1966   A. H. A. TILLOY   3,276,553
ONE WAY BRAKE DEACTIVATED BY DRIVE TORQUE REVERSAL
Filed July 20, 1964   2 Sheets-Sheet 1

Inventor
A.H.A. TILLOY
By Holcombe, Wetherill & Brisebois
Attorneys

Oct. 4, 1966  A. H. A. TILLOY  3,276,553
ONE WAY BRAKE DEACTIVATED BY DRIVE TORQUE REVERSAL
Filed July 20, 1964  2 Sheets-Sheet 2

Inventor

A.H.A. TILLOY

By Holcombe, Wetherill & Brisebois

Attorneys 3,276,553
ONE WAY BRAKE DEACTIVATED BY
DRIVE TORQUE REVERSAL
Andre Henri Antoine Tilloy, Versailles, France, assignor to Societe Generale d'Entreprises, Colombes, Seine, France, a corporation of France
Filed July 20, 1964, Ser. No. 383,896
Claims priority, application France, July 19, 1963, 942,126
5 Claims. (Cl. 192—8)

The present invention relates to a device which automatically ensures, in a transmission of mechanical movement:

(1) The retaining of the load driven when the driving torque at the transmission input has ceased and this load tends to produce a reverse movement.

(2) The release of the load to allow reverse movement of the load when this movement is not produced by the load but controlled by reverse driving torque.

This device mainly applies to winches of all types, wherein the load must be locked as soon as traction ceases, and must be released when it is desired to release the load. It may however also be applied to any transmission of movement or stress, for example in the coupling of a motor to a reduction gear where, when the motor is switched off, it is necessary to prevent any reverse movement of the assembly coupled thereto but for this movement to be made possible if controlled by a driving torque in the reverse direction.

Certain drives produced with this aim in view use a pawl and ratchet arrangement but necessitate a manual operation to raise the pawl when reverse operation is required. If this operation is forgotten, it is either impossible to effect reverse operation or damage is caused.

Other drives are provided with a brake acting upon the driven shaft when it is drawn in reverse direction by the load once the driving torque ceases. But this brake is not released when it is required that this reverse movement be controlled by the driving shaft, which must then produce a torque to overcome the braking torque.

The invention has as its object a coupling device having a non-reversing mechanism which allows the movement to resist reversing caused by the action of the load but allows reversing when the movement is controlled by the driving shaft. According to the invention, a two-directional coupling device for coupling a driving shaft to a driven shaft and having a non-reversing action comprises a first and a second circular coupling member fixed coaxially respectively to the driving shaft and the driven shaft, a set of driving pins fixed to one said member and engaging in a set of holes in the other said member so as to permit slight relative angular movement of said members, a drum rotatable freely about the second member and provided with a brake restraining said drum, freewheel means arranged between the coaxial cylindrical surfaces of the second member and of the drum so as to oppose the uncontrolled rotation in reverse direction of the driven shaft, and suppressing means controlled by said relative angular movement of the members releasing said brake when the driving shaft is driven in reverse direction.

In one embodiment of the invention, the free wheel is inserted between the driven shaft and a braked drum, the brake of which is placed out of action when the driving shaft sets up a reversing rotation.

In order to allow for the relative angular movement of the two coupling plates, said plates may be connected by driving plate pins secured to one of the plates and engaged in holes in the other.

According to a feature of the invention, the mechanism acting upon the free wheel under the effect of the relative angular movement of the coupling plates comprises a second free wheel arranged in the same direction as the first free wheel and located on the driving shaft, the movement of the rim of said second free wheel under the effect of the reversing rotation of the motor shaft ensuring the releasing of the brake from the drum of the first free wheel.

Figure 2:
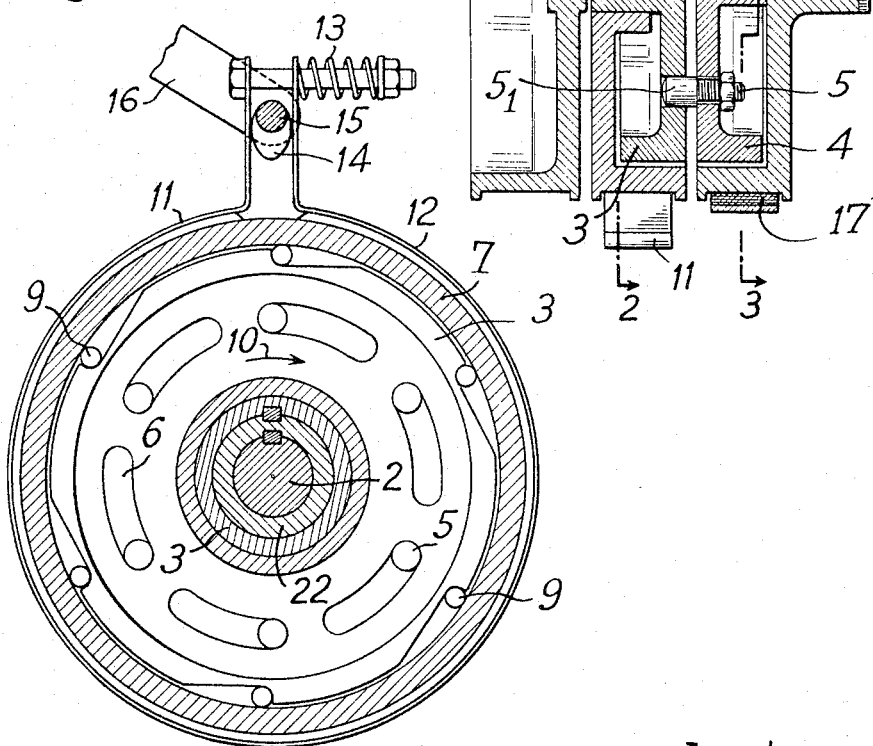
Figure 3:
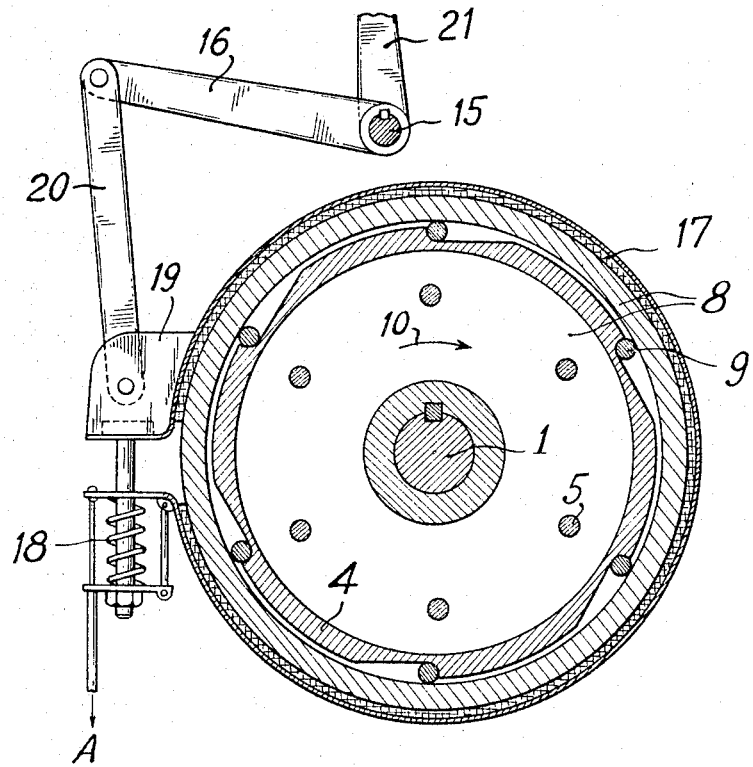

In order that the invention may be more clearly understood, an embodiment thereof will now be described by way of non-limiting example with reference to the annexed accompanying drawings, in which:

FIGURE 1 is a view in longitudinal section of the coupling of the two shafts with their plates and drums, FIGURE 2 is a cross-sectional view of FIGURE 1 looking from the left at the end of the driven shaft and of its keyed plate, together with the drum to which it is connected by the free wheel, and the shoe brake system on said wheel, FIGURE 3 is a view from the left in section along the line 3—3 perpendicular to the axis of the driving shaft and of the coupling plate with the drum to which it is connected by means of the free wheel and the friction rim about said drum.

In the diagrams, the shaft 1 is the driving shaft and the shaft 2 the driven shaft. On the shaft 2 is keyed the coupling plate 3 and on the shaft 1 the coupling plate 4 which carries the driving plate pins 5 on the same diameter, the pins being able to move into the circumferential windows or holes 6 provided in the plate 3.

The drum 7 rotates freely about the plate 3 and the drum 8 about the plate 4. Slotted cams are provided in the plates 3 and 4 into which cams are located cylindrical rollers 9 and 9 bis. These cams are arranged in such a manner that in the direction of normal drive, which will be assumed to be the direction of the arrow 10, the rollers are thrust into the deepest portion of the slots and do not jam between the plates 3 and 7 or between the plates 4 and 8. However, when the plates 3 and 4 rotate in the direction opposite that of the arrow 10, the rollers will be blocked and the drum 7 will be driven by the plate 3 (FIGURE 2) and the drum 8 by the plate 4 (FIGURE 3).

The drum 7 (FIGURE 2) is normally fixed in rotation by two external brake shoes 11 and 12 articulated with respect to one another and urged against the drum by means of an adjustable spring 13, and which may be moved apart by a cam 14 carried by a shaft 15 which carries a control lever 16.

About the drum 8 (FIGURE 3) is located a friction ring 17, which is urged against the drum 8 by an adjustable spring 18. This friction ring carries a lug 19 connected by means of a rod 20 to the control lever 16 of the cam 14. Consequently when the driving shaft 1 and its plate 4 rotate in the direction of the arrow 10, the rollers 9 bis do not drive the friction drum 8 which remains motionless. By means of pins 5 the plate 4 drives the plate 3 and consequently the shaft 2. The rollers 9 do not drive the braked drum 7. The transmission of the movement from the shaft 1 to the shaft 2 is thus ensured.

When the shaft 1 stops its movement and is free of driving torque, if the load driven reacts and tends in its turn to drive the shaft 2 and the plate 3 in the direction opposite that of the arrow 10, the movement is immediately blocked by the jamming of the rollers 9 in the braked drum 7, and reversing movement is thus rendered impossible.

However, if the task requires that the shaft 2 rotates in a reverse direction, it may be released by a first means which consists in opening the shoes 11 and 12 of the brake by means of the cam 14 operated by a hand lever 21 free on the shaft 15 but able to control it by means of catches or teeth 23, if the load is sufficient to drive the shaft 2 in a reverse direction. If this reversing movement is to be controlled by the driving shaft 1, the holes 6 provided in the stationary plate 3 allow the pins 5 and consequently the plate 4 and the shaft 1 to begin to rotate in a reverse direction. The jamming of the rollers 9 bis causes the plate 4 to drive the drum 8 and its friction ring 17 which acts by means of the rod 20 on the lever 16 and the fixed cam 14 which releases the brake shoes 11 and 12.

When the pins 5 reach the base of the holes 6, the plate 4 continues to move in a reverse direction and then drives the plate 3 and then, by jamming of the rollers 9, the drum 7 which is then able to rotate, its brake being released by the friction torque throughout the rotation of the drum 8 and the shaft 1.

When the reversing rotation ceases and the shaft becomes free, the friction torque controlling the cam of the brake also ceases and the brake shoes 11 and 12 are reapplied to the drum by means of their spring, thus once again preventing movement of the driven shaft 2 by means of the drum 7, the rollers 9, and the plate 3.

This system thus ensures, automatically and without additional operations, the non-reversibility of the movement by the action of the load and reversibility when controlled by the driving torque.

The adjustment of the system consists in constructing the brake shoes 11 and 12 and spring 13 to be of such a size that they are able to retain the maximum load driven, as also the friction drag of the band 17, its lever and the cam so that the friction torque is able to open the brake shoes.

The invention is not limited to the above described embodiment, but may be embodied in various other ways, and may also have additional features.

An advantageous addition may consist of a third drum 22 made integral with or secured to the plate 3 and the driven shaft 2, on which may act a hand-operated safety brake or immobilising device.

Another advantageous addition may consist in a supplementary releasing action of the friction ring 17 by the manual control lever 21 and a flexible transmission A, when the driving shaft 1 is to drive the driven shaft 2 in the direction opposite to that of the arrow 10 for some considerable period, which would mean an abnormally high and useless increase in the temperature of the friction ring.

Variations in the embodiment may, for example, consist in a drive by means of concentric drums, having peripheral slots or sheaths in place of the plates described, or by different arrangements of the free wheel mechanism 9 and 9 bis, or by disc brakes or friction couplings or by any different arrangements of the brake opening mechanism, the principle of the invention being a simple direct drive in which when the driven shaft is locked by a non-reversing device the driving shaft is allowed an initial movement and action which control the reversibility without having to overcome a considerable braking torque until the driving shaft stops.

I claim:

1. A two-directional coupling device for coupling a driving shaft to a driven shaft and having a non-reversing system, comprising a first and a second circular coupling member fixed coaxially respectively to the driving shaft and the driven shaft, a set of driving pins fixed to one said member and engaging in a set of holes in the other said member so as to permit slight relative angular movement of said members, a drum rotatable freely about the second member and provided with a brake restraining said drum, free-wheel means arranged between the coaxial cylindrical surfaces of the second member and of the drum so as to oppose the uncontrolled rotation in reverse direction of the driven shaft and suppressing means controlled by said relative angular movement of the members releasing said brake when the driving shaft is driven in reverse direction.

2. A two-directional coupling device according to claim 1, comprising a second drum rotatable freely about the first member, and wherein said suppressing means comprises a second free-wheel means free in the same direction as the first free-wheel and located between said first coupling member and said second drum, whereby the driving of said second drum in rotation in reverse direction by the driving shaft releases said brake from the first-said drum and free-wheel.

3. A two-directional coupling device according to claim 1, comprising a wheel attached to said driven shaft and a manual safety brake engageable with said wheel.

4. A two-directional coupling device for coupling a driving shaft to a driven shaft and having a non-reversing system, comprising a first and a second circular coupling member fixed coaxially respectively to the driving shaft and the driven shaft, a set of driving pins fixed to one said member and engaging in a set of holes in the other said member so as to permit slight relative angular movement of said members, a drum rotatable freely about the second member and provided with a brake restraining said drum, free-wheel means arranged between the coaxial cylindrical surfaces of the second member and of the drum so as to oppose the uncontrolled rotation in reverse direction of the driven shaft, a second drum rotatable freely about said first member, a second free wheel means free in the same direction as the first free-wheel and located between said first coupling member and said second drum, a second brake engaging the outer surface of said second drum, means for transmitting the movement of said second brake to said first brake, so that rotation of said driving shaft in reverse direction causes said first brake to be released and thus permits the driven shaft to be driven in reverse direction.

5. A two-directional coupling device according to claim 4, comprising a manual brake control enabling said first brake to be maintained in released position and concurrently releasing said second brake.

References Cited by the Examiner
UNITED STATES PATENTS

| | | | |
|---|---|---|---|
| 1,482,924 | 2/1924 | Hescock | 192—15 |
| 1,529,248 | 3/1925 | Greene et al. | 192—8 |
| 2,888,843 | 6/1959 | Hollis | 192—8 X |
| 2,934,188 | 4/1960 | Bremer | 192—8 |
| 3,011,605 | 12/1961 | Hungerford et al. | 192—8 |
| 3,068,975 | 12/1962 | Theuer | 192—8 |

DAVID J. WILLIAMOWSKY, *Primary Examiner.*

B. W. WYCHE, *Assistant Examiner.*